US012424139B2

(12) United States Patent
Johnston et al.

(10) Patent No.: US 12,424,139 B2
(45) Date of Patent: Sep. 23, 2025

(54) PULSE SPLITTING FOR MOTION ARTIFACT REDUCTION

(71) Applicant: Apple Inc., Cupertino, CA (US)

(72) Inventors: Scott R Johnston, San Francisco, CA (US); Ganghun Kim, Milpitas, CA (US); Jose A Dominguez-Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 18/204,926

(22) Filed: Jun. 1, 2023

(65) Prior Publication Data

US 2024/0005835 A1 Jan. 4, 2024

Related U.S. Application Data

(60) Provisional application No. 63/376,490, filed on Sep. 21, 2022, provisional application No. 63/356,773, filed on Jun. 29, 2022.

(51) Int. Cl.
*G09G 3/20* (2006.01)

(52) U.S. Cl.
CPC ... *G09G 3/2074* (2013.01); *G09G 2300/0452* (2013.01); *G09G 2320/0626* (2013.01)

(58) Field of Classification Search
CPC ......... G09G 3/2074; G09G 2300/0452; G09G 2320/0626
See application file for complete search history.

(56) References Cited

U.S. PATENT DOCUMENTS

| | | | | |
|---|---|---|---|---|
| 10,971,086 | B2 * | 4/2021 | Le | G09G 3/3406 |
| 2012/0327139 | A1 | 12/2012 | Margulis | |
| 2019/0206565 | A1 | 7/2019 | Shelton, IV | |
| 2019/0244572 | A1 * | 8/2019 | Le | G09G 3/3406 |
| 2020/0202773 | A1 | 6/2020 | Genoe | |

* cited by examiner

*Primary Examiner* — Michael Pervan
(74) *Attorney, Agent, or Firm* — Fletcher Yoder P.C.

(57) ABSTRACT

Systems, methods, and devices for reducing or eliminating image artifacts due to motion are provided. An electronic display may include an electronic display panel having a display pixel, an optical combiner that directs light from the display pixel toward a viewing area, and display driver circuitry. The display driver circuitry may receive image data that defines a total pulse width for one image frame. The display driver circuitry may cause the display pixel to emit light in multiple pulses totaling to the total pulse width for the display pixel for one image frame.

20 Claims, 13 Drawing Sheets

PULSE SPLITTING FOR MOTION ARTIFACT REDUCTION

CROSS-REFERENCE TO RELATED APPLICATIONS

This application claims priority to U.S. Provisional Application No. 63/356,773, filed Jun. 29, 2022, titled "Pulse Splitting for Motion Artifact Reduction," and U.S. Provisional Application No. 63/376,490, filed Sep. 21, 2022, titled "Pulse Splitting for Motion Artifact Reduction," both of which are hereby incorporated by reference in their entirety for all purposes.

SUMMARY

The present disclosure relates generally to electronic devices with display panels, and more particularly, to using a pulse width modulation scheme to compensate for motion artifacts due to display panel non-uniformity.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic displays may display images that present visual representations of information. Accordingly, numerous electronic systems—such as computers, mobile phones, portable media devices, tablets, televisions, virtual-reality headsets, and vehicle dashboards, among many others—often include or use electronic displays. An electronic display may generally display an image by actively controlling light emission from its display pixels. By adjusting the brightness of different color components of the display pixels, a variety of different colors may be generated that collectively produce a corresponding image.

Some electronic displays vary the amount of light emitted by each display pixel by pulsing the display pixels for different amounts of time. The longer the pulse, the more light emitted by each display pixel. If all display pixels of the electronic display have the same characteristics, pulsing each display pixel for the same amount of time would result in the pixels all emitting an equal amount of light. In reality, however, different display pixels may have different electrical characteristics that cause different amounts of light to be emitted for the same length of pulse. To compensate for these pixel non-uniformities, some pixels may be pulsed for relatively longer or relatively shorter than other display pixels to achieve the same amount of light emission. For example, a brighter pixel may be pulsed for slightly less time or a darker pixel may be pulsed for slightly more time.

While adjusting the pulse widths in this way may reduce display pixel non-uniformity across the electronic display, it could introduce new artifacts when the electronic display is moved. Indeed, when the electronic display moves, the human eye may integrate light from one display pixel having a first pulse width and intensity with another display pixel having a second pulse width and intensity different from the first pulse width and intensity, resulting in some display pixels appearing brighter or darker than they would otherwise appear if the electronic display were stationary.

Accordingly, the present disclosure provides systems and methods for compensating for image artifacts due to motion, which may cause spatially overlapping pulse widths of light. For example, processing circuitry may implement a pulse width modulation scheme to split a pulse of each display pixel into multiple discrete pulses. The total amount of light emitted by each display pixel in multiple pulses is the same amount of light that would be emitted during a single longer pulse. However, in the event that the electronic display moves (relative to a viewer), the multiple pulses may improve the distribution of the light emission over time, such as more evenly distribute the light emissions resulting in less drastic light emission variation between pixels. For example, the pulse of a given display pixel may be split into multiple (in some cases identical or nearly identical) pulses in a single period that collectively result in the same light emission as one longer pulse over the same period. There may be any suitable number of multiple pulses in a period. By splitting a single pulse in a period into multiple pulses in the same period, motion image artifacts may be reduced or eliminated due to the viewer's eye(s) more evenly integrating the multiple pulses in comparison to the single pulse within the period. Accordingly, the resulting image content on the electronic display may appear smoother to the viewer.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
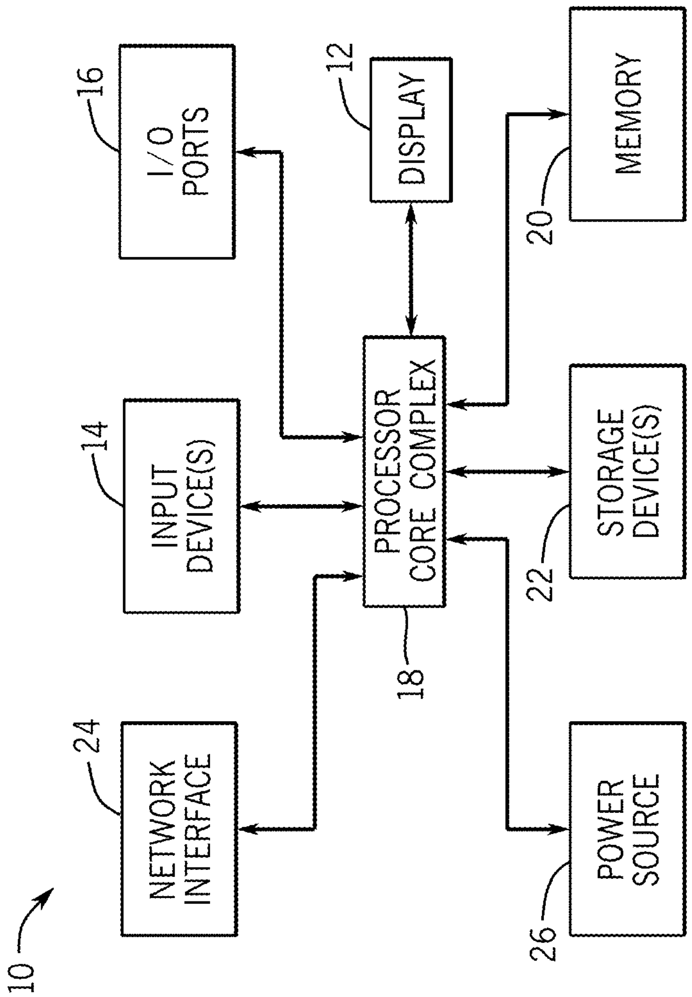
FIG. 1 is a block diagram of an electronic device with an electronic display, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

In addition to enabling user inputs, the electronic display 12 may use display pixels to produce images by emitting different amounts of light. In one example, the electronic display 12 may include a self-emissive pixel array having an array of one or more of self-emissive pixels. The electronic display 12 may include any suitable circuitry to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
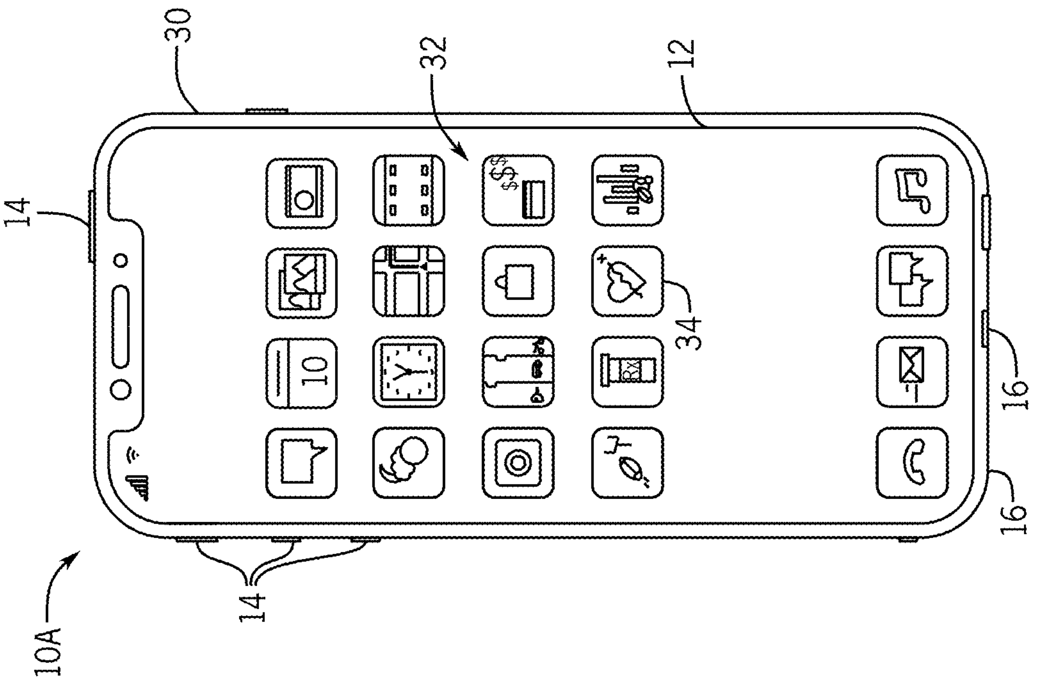
FIG. 2 is an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
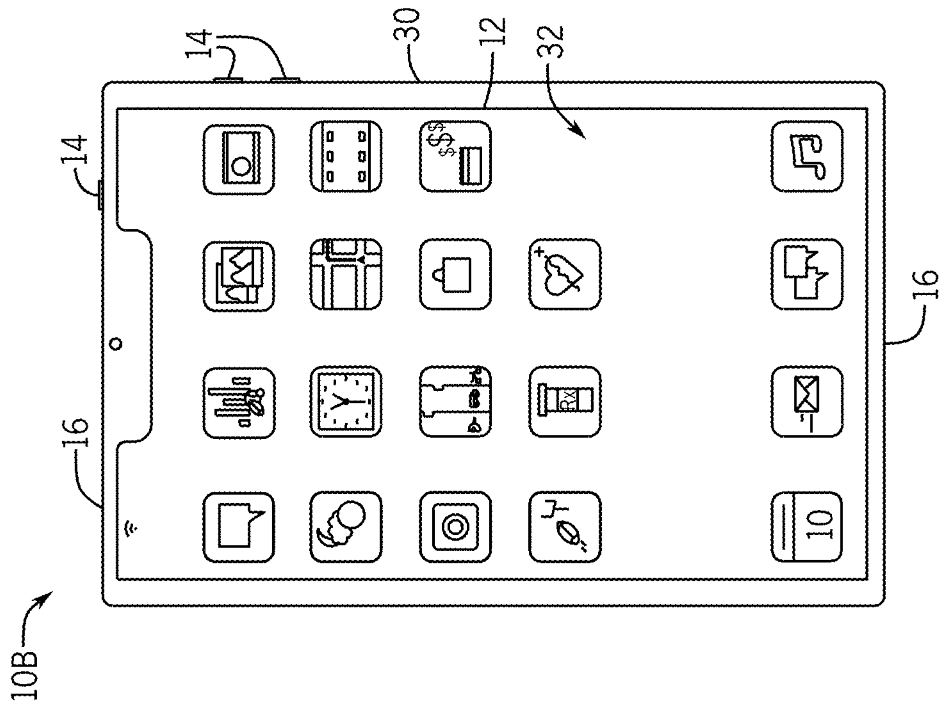
FIG. 3 is another example of the electronic device of FIG. 1, in accordance with an embodiment.
Figure 4:
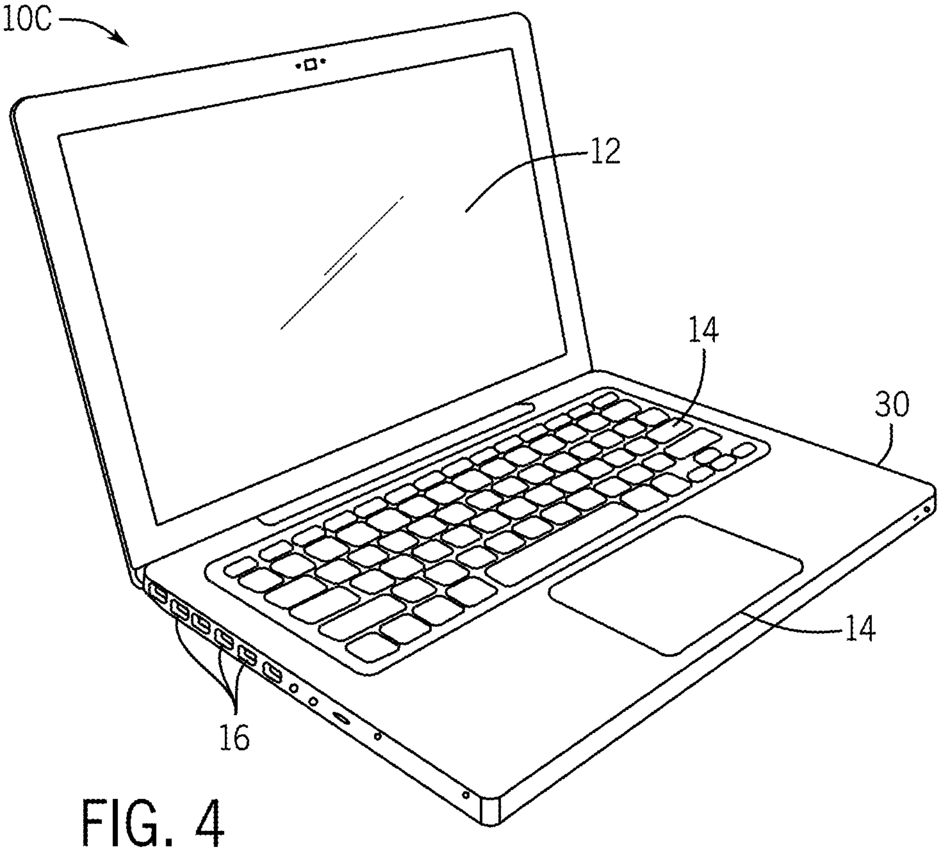
FIG. 4 is another example of the electronic device of FIG. 1, in accordance with an embodiment.
Figure 5:
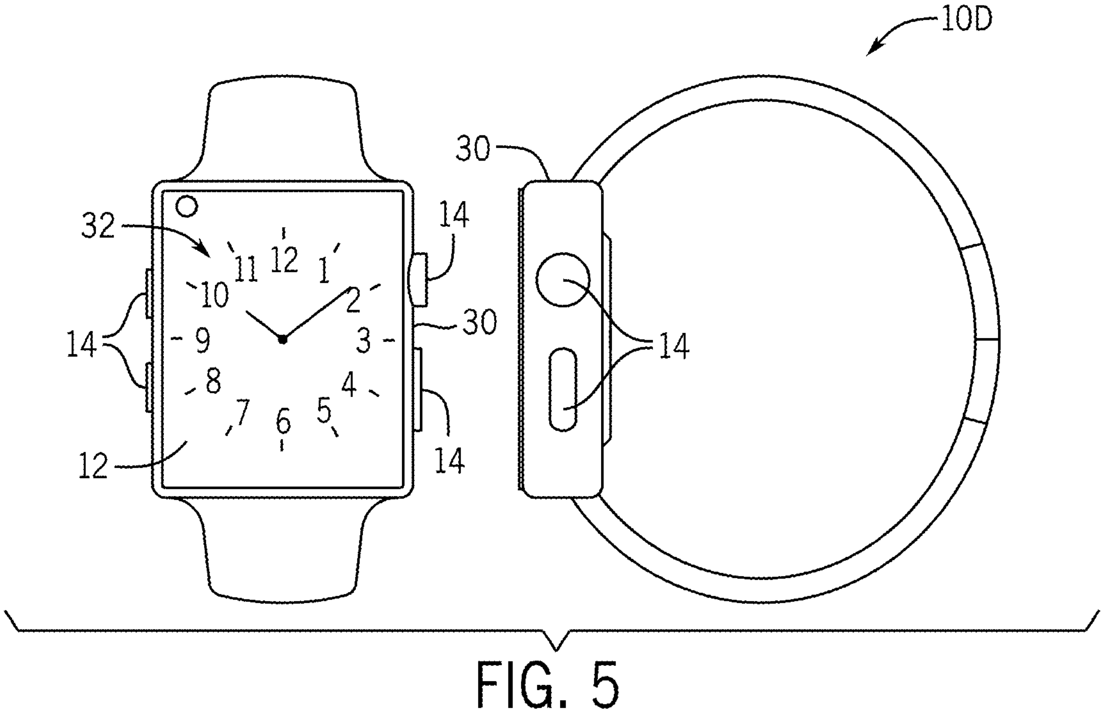
FIG. 5 is another example of the electronic device of FIG. 1, in accordance with an embodiment.

Another example of a suitable electronic device 10, specifically a tablet device is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
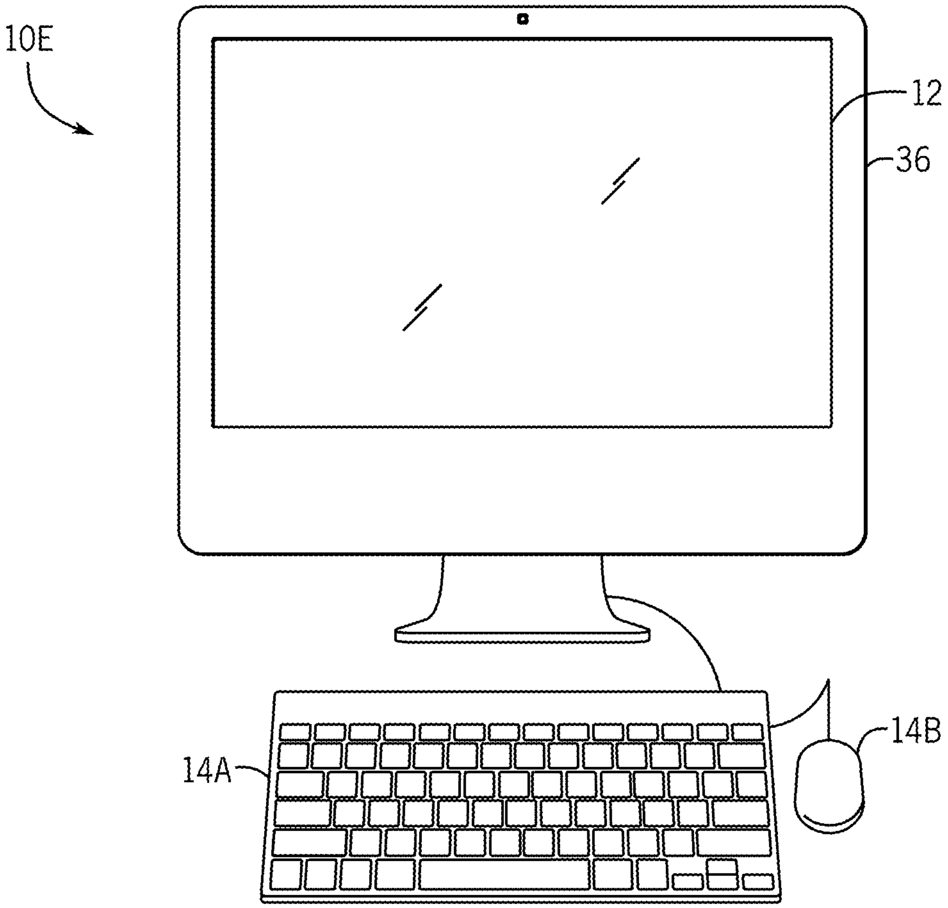
FIG. 6 is another example of the electronic device of FIG. 1, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
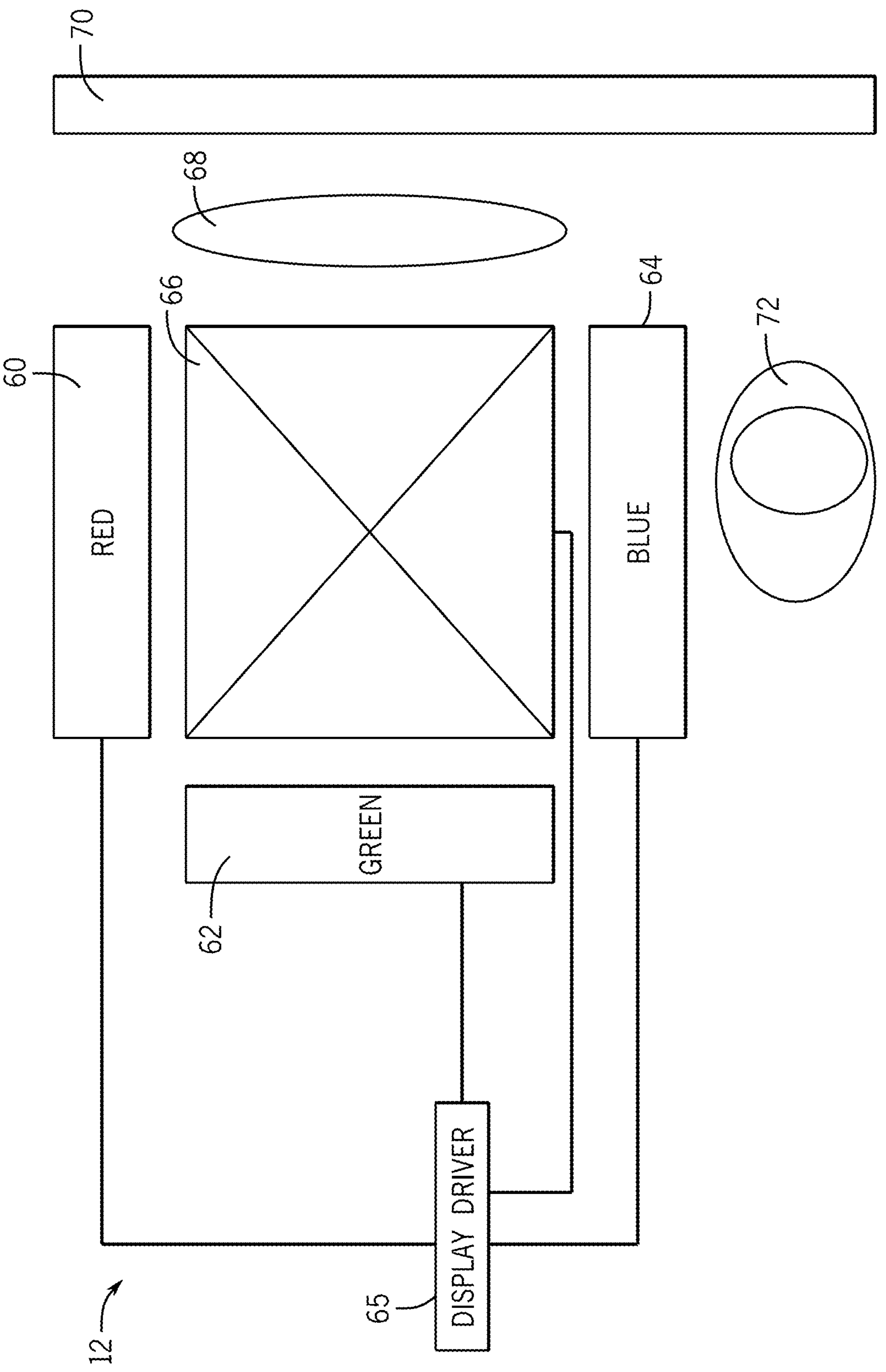
FIG. 7 is a block diagram of a display with several monolithic display panels emitting light to form the image content, in accordance with an embodiment.

With the foregoing in mind, FIG. 7 depicts a block diagram of an example architecture of the electronic display 12. In the example of FIG. 7, the electronic display 12 uses three monolithic display panels 60, 62, and 64 that include may each include micro-LEDs having display pixels of a single color. The monolithic display panels may include a red display panel 60, a green display panel 62, and a blue display panel 64, which may include micro-LEDs corresponding to display pixels of the electronic display 12. The red display panel 60 may include one or more red micro-LEDs, which may emit red light corresponding to red display pixels of the electronic display 12, the green display panel 62 may emit green light corresponding to green display pixels of the electronic display 12, and the blue display panel 64 may emit blue light corresponding to blue display pixels of the electronic display 12. The electronic display 12 may include display driver circuitry 65 to drive the display panels 60, 62, and 64 to emit light corresponding to the image data.

The display driver circuitry 65 may receive RGB-format video image data for the electronic display 12. The display driver circuitry 65 may cause light emitted by the display pixels of the display panels 60, 62, and 64 to result an image corresponding to the image data. In an embodiment, the display driver circuitry 65 may include multiple micro-LED drivers that individually drive a matrix array (e.g., local passive matrix, active matrix array) of display pixels of the display panels 60, 62, and 64, and the optical combiner 66. For example, one or more micro-LED drivers may drive the display pixels of red display panel 60 to emit light based on the image data, one or more micro-LED drivers may drive the display pixels of the green display panel 62, and one or more micro-LED drivers may drive the display pixels of the blue display panel 64. Each display pixel may be driven for a particular amount of time based on image data corresponding to that display pixel. A light emission of the display pixel may last for an amount of time referred to as a pulse width (e.g., one pulse cycle of the display pixel). In some instances, the pulse may last less than a few microseconds.

The pulses of light from the display panels 60, 62, and 64 may be combined by the optical combiner 66 to form the image content. For example, the optical combiner 66 may receive light emissions from the display pixels of the red display panel 60, light emissions from the display pixels of the green display panel 62, and light emissions from the display pixels of the blue display panel 64. The light emissions from the display panels 60, 62, and 64, as combined by the optical combiner 66, may correspond to millions of display pixels of the display 12. The optical combiner 66 may combine the light emission from the display panels 60, 62, and 64 to form the image content and send the image content to a lens 68. The lens 68 may be coupled to the light guide 70 to project the image on top of a viewer's eye 72. For example, the lens 68 and the light guide 70 may direct the light to a viewing area, where the viewer's eye 72 may integrate the light to form the image content. In the illustrated embodiment, the lens 68 may be positioned between the optical combiner 66 and the light guide 70.

In an embodiment, a pulse width modulation scheme may be implemented by the processing circuitry or the display driver circuitry 65 to split a single longer pulse into multiple shorter pulses of total duration equal to the single longer pulse. For example, to create a two-pulse-cycle period, the display drivers may drive pixels of the display panels 60, 62, and 64 to emit light twice in the amount of time it may have taken to emit light once in the one pulse cycle period. As such, each pulse of the two-pulse cycle period may last half as long as the one pulse, discussed above. However, the amount of light emitted during the two-pulse cycle period may be the same the amount of light emitted by during the one-pulse cycle period.

In another example, a single pulse may correspond to image data of a particular gray level that defines an amount of light to be emitted by a particular display pixel. The pulse width may be a time the display pixel is emitting light, which may correspond to a length of pulse emission. To create four pulses or a four-pulse-cycle period, the pulse width of the single pulse may be split into fourths (¼). Thus, the gray level of the four-pulse-cycle period may be the same as the gray level of the single pulse.

Figure 8:
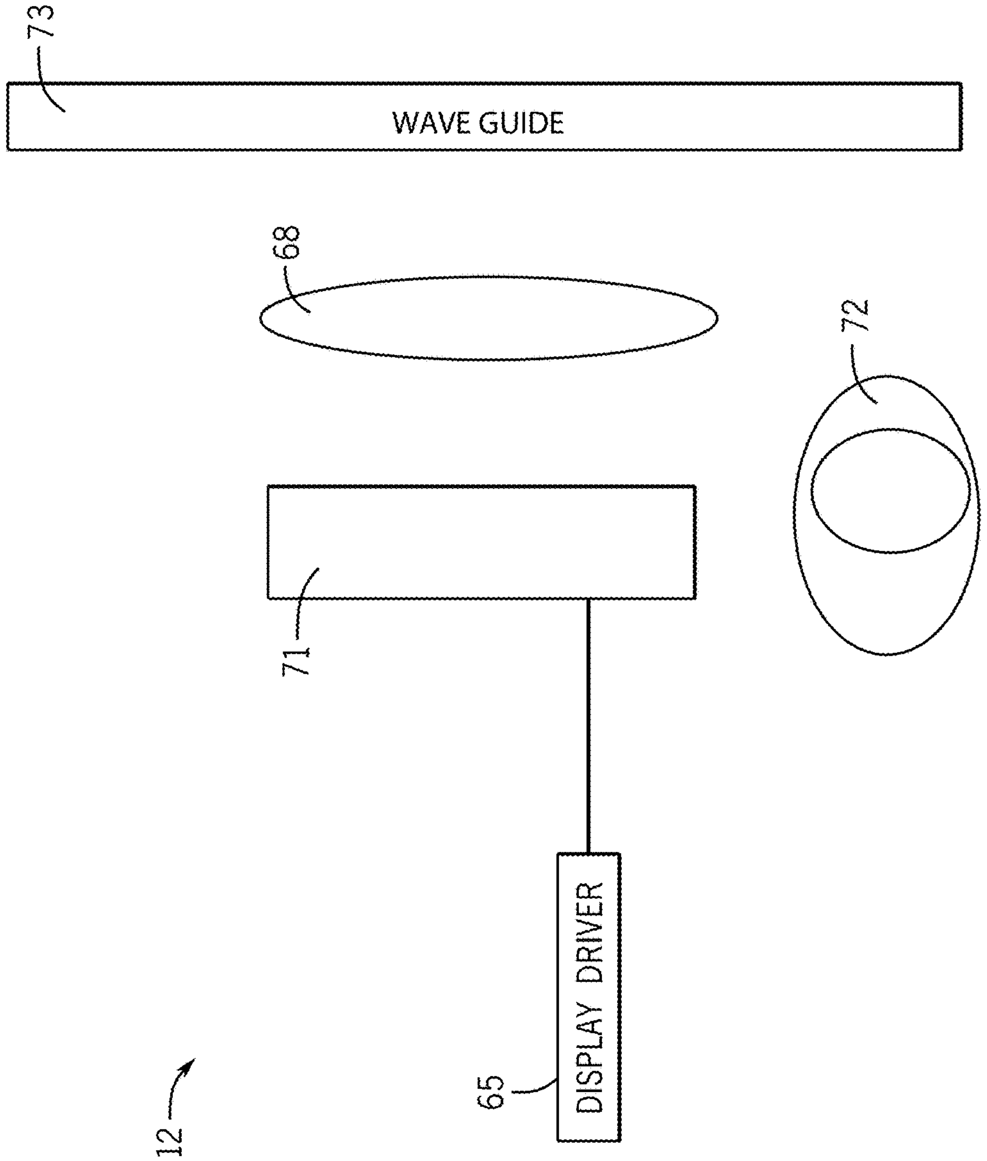
FIG. 8 is a block diagram of a display with one display panel emitting light to form the image content, in accordance with an embodiment.

In an embodiment, the electronic display 12 may include a display panel having pixels of different colors. FIG. 8 depicts a block diagram of an example architecture of the electronic display 12. In the example of FIG. 8, the electronic display 12 uses a display panel 71 that may include micro-LEDs having pixels of different colors. For example, the display panel 71 may include red micro-LEDs, green micro-LEDs, blue micro-LEDs, or any combination thereof. Indeed, the display driver circuitry 65 may drive the display panel 71 to emit light corresponding to the image data.

The display driver circuitry 65 may receive RGB-formal video image data for the electronic display 12 and cause light emitted by the micro-LEDs of the display panel 71 to result in image content corresponding to the image data. For example, the micro-LED driver may drive display pixels of the display panel 71 to emit light based on the image data. Each display pixel may be driven for a particular amount of time based on image data corresponding to that display pixel.

The lens 68 may receive light emissions from the micro-LEDs and project image content on top of the viewer's eyes 72. As illustrated, the lens 68 may be positioned between the display panel 71 and a wave guide 73. The wave guide 73 may be a transparent (e.g., see-through) optical combiner to direct the light emissions from the display pixels to the viewer's eye 72 to provide the image content.

Indeed, the pulse width modulation scheme may be implemented by the processing circuitry and/or the display driver circuitry 65 to split a single longer pulse of the display pixels into multiple shorter pulses of total duration equal to the longer pulse. For example, to create a four-pulse-cycle period, the display driver 65 may drive display pixels of the display panel 71 to emit light four times in the amount of time it may have taken to emit light once in the one pulse cycle period. In another example, a single pulse may correspond to image data of a particular gray level. To create a two-pulse-cycle period, the pulse width may be split in half (½). In this way, the gray level of the two-pulse-cycle period may be the same as the gray level of the single pulse.

Figure 9:
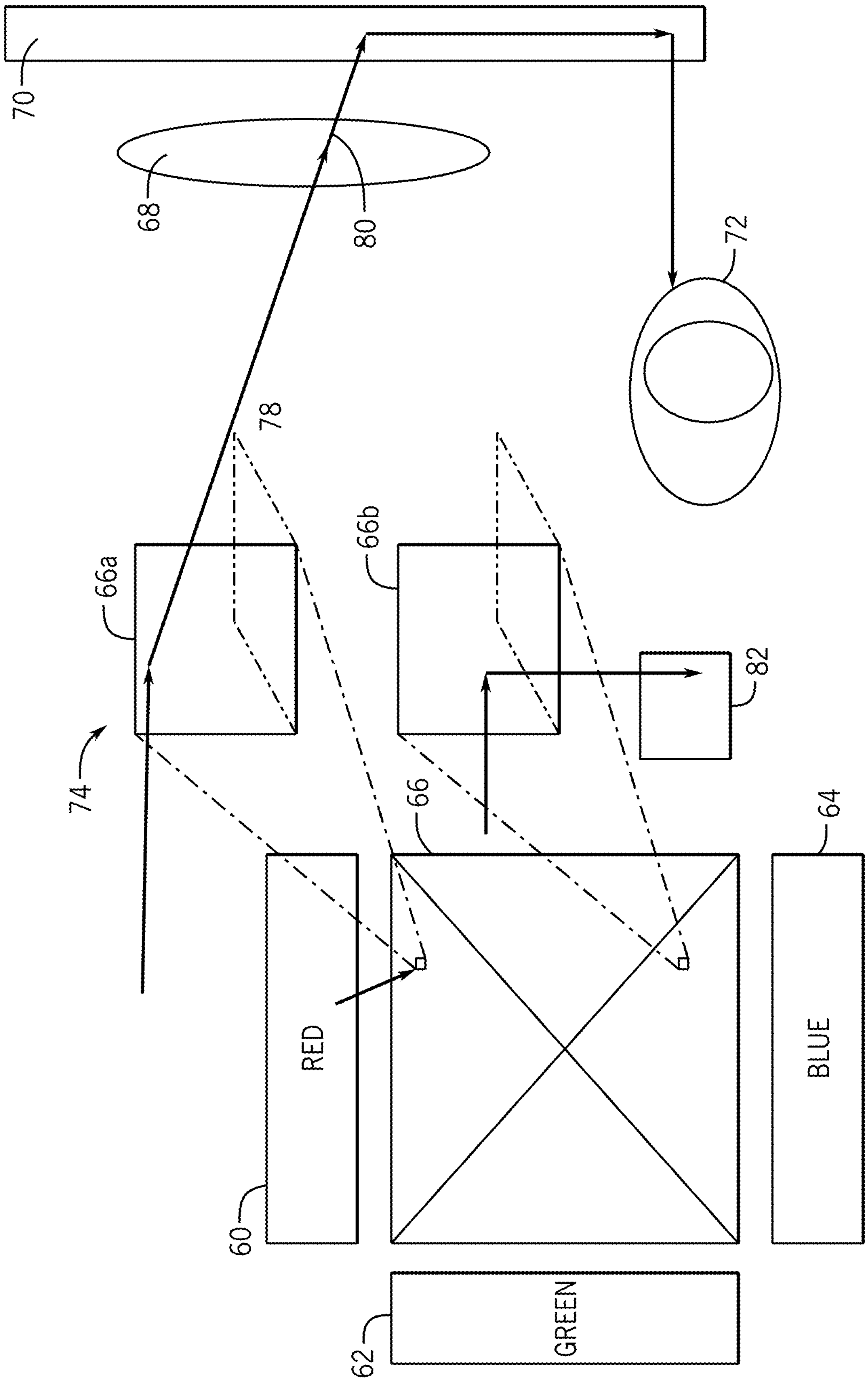
FIG. 9 is a block diagram of the display emitting light to form the image content, in accordance with an embodiment.

In an embodiment, the optical combiner 66 that may be a mirror array 66 that directs light emissions from the display panels 60, 62, and 64 to light up a viewing area for an associated display pixel of the display 12. With the preceding in mind, FIG. 9 depicts a block diagram of another example architecture of the electronic display 12. In the example of FIG. 9, the electronic display 12 uses the mirror array 66 to direct light from the display panels 60, 62, and 64 to the lens 68 and the light guide 70 for the viewer's eye(s) 72 to integrate and form the image content of the display 12. As described herein, the display 12 may include the monolithic display panels 60, 62, and 64 corresponding to a color of light. For example, the red display panel 60 may include red micro-LEDs that emit red light, the green display panel 62 may include green micro-LEDs that emit green light, and the blue display panel 64 may include blue micro-LEDs that emit blue light. As such, the mirror array 66 may direct an amount of light from the display panels 60, 62, and 64 to the lens 68 and/or the light guide 70 to create the image content of the display 12.

The mirror array 66 may include multiple micro-mirrors which may be toggled between an on-state and an off-state by the display driver circuitry 65. For example, independent mirrors of the mirror array 66 may be switched between an on-state or an off-state. The display driver 65 may cause a mirror of the mirror array 66 to rotate by some number of degrees (e.g., 10° to 12°), which may correspond to the on-state and the off-state. For example, when a first micro-mirror **66*a* may be rotated to the on-state, the first micro-mirror 66*a* may direct the light from the display panels 60, 62, and 64 to the lens 68 to light up the associated display pixel of the electronic display 12. The light may be guided from the lens 68 through the light guide 70 to the viewer's eye 72. Indeed, the light at point 80 may correspond to a particular display pixel of the display 12 and sent by the light guide 70 to the viewer's eye(s) 72. In another example, a second micro-mirror 66*b* may direct light from the blue display panel 64 to the heatsink 82, resulting in the associated display pixel appearing dark. The heatsink 82 may be a passive heat exchanger that transfers heat created by the light away. In another embodiment, the off-state 78 of the micro-mirror 66*b* may correspond to the micro-mirror 66*b* being rotated such that light may not be directed to the lens 68** and the associated display pixel may appear dark. The transition between the on-state and the off-state may create one pulse of the display pixel, which may be on for an amount of time referred to as a pulse width. A duty cycle of the pulse is the ratio of time in the on-state to the off-state of the display pixel. In practice, the duty cycle of the on-state to the off-state for light corresponding to a particular display pixel affects how bright it appears. The longer the on-state pulse compared to the off-state, the brighter the display pixel may appear.

The display driver circuitry 65 may cause the mirror array 66 may apply the pulse width modulation scheme to split the pulse width. For example, to create a two pulse-cycle period, the display drivers may drive pixels of the display panels 60, 62, and 64 to emit light twice by toggling the mirrors of the mirror array 66 between the on-state and the off-state twice in the time it may have taken to transition between the on-state and the off-state for the one-pulse-cycle period. However, the duty cycle of the two-pulse-cycle period may be the same as the one-pulse-cycle period.

Figure 10:
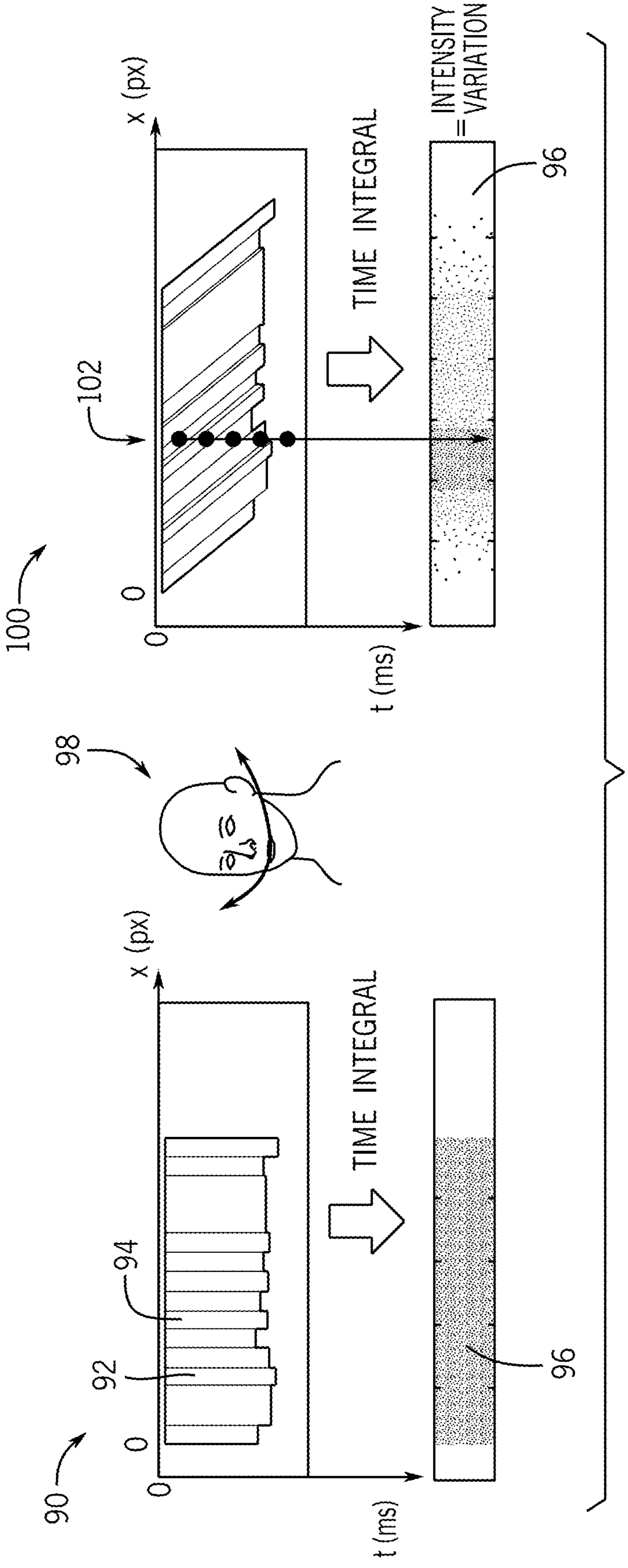
FIG. 10 is a graph depicting an intensity of a pulse of the display pixel over a time, in accordance with an embodiment.

With the preceding in mind, FIG. 10 illustrates a graph 90 depicting pulses of light corresponding to several display pixels over time under static conditions. The x-axis of the graph 90 corresponds to locations at the viewer's eye (here, corresponding to display pixels of a row of display pixels) and the y-axis of the graph 90 corresponds to an amount of time the light emissions may be received at each location at the viewer's eye (here, corresponding to the amount of time each display pixel is pulsed). Of note, different display pixels may have different pulse times, as shown by pulses 92 and 94, but an integration 96 of the total amount of emitted light may be uniform between them. This may be due to differing light emission characteristics of the individual display pixels. For example, some display pixels may be natively brighter while others may be natively darker owing to process, voltage, or temperature differences. Thus, to correct for such display pixel nonuniformities, brighter display pixels may be pulsed for a shorter time and darker display pixels may be pulsed for a longer time to achieve uniform light emission across the different display pixels. In the example of the graph 90 of FIG. 10, the viewer's eye integrates the total light emitted by the pulses to see an equal total amount of light and, accordingly, a uniform brightness across the different display pixels. In other words, darker pulses of light from darker display pixels may be relatively longer and brighter pulses of light from brighter display pixels may be relatively shorter to achieve the same total light output.

Motion 98, however, could cause light from one display pixel to be integrated with light from other display pixels, as shown in a graph 100. Like the graph 90, the x-axis of the graph 100 corresponds to locations at the viewer's eye and the y-axis of the graph 100 corresponds to an amount of time light is received at each location. Due to the motion 98, the same location of a viewer's eye in the graph 100—which in the graph 90 would correspond to a single display pixel—now may receive light from pulses from multiple different display pixels. As such, the integration 96 of the light may be non-uniform. In one particular example, a location 102 of the graph 100 may include light pulses from five different display pixels, producing a high total amount of light that is integrated for that location. The appearance of light intensity variation, even though the display pixels are emitting uniform total amounts of light, represents an undesirable image artifact, such as motion blur, color speckle, shimmering, or the like.

Figure 11:
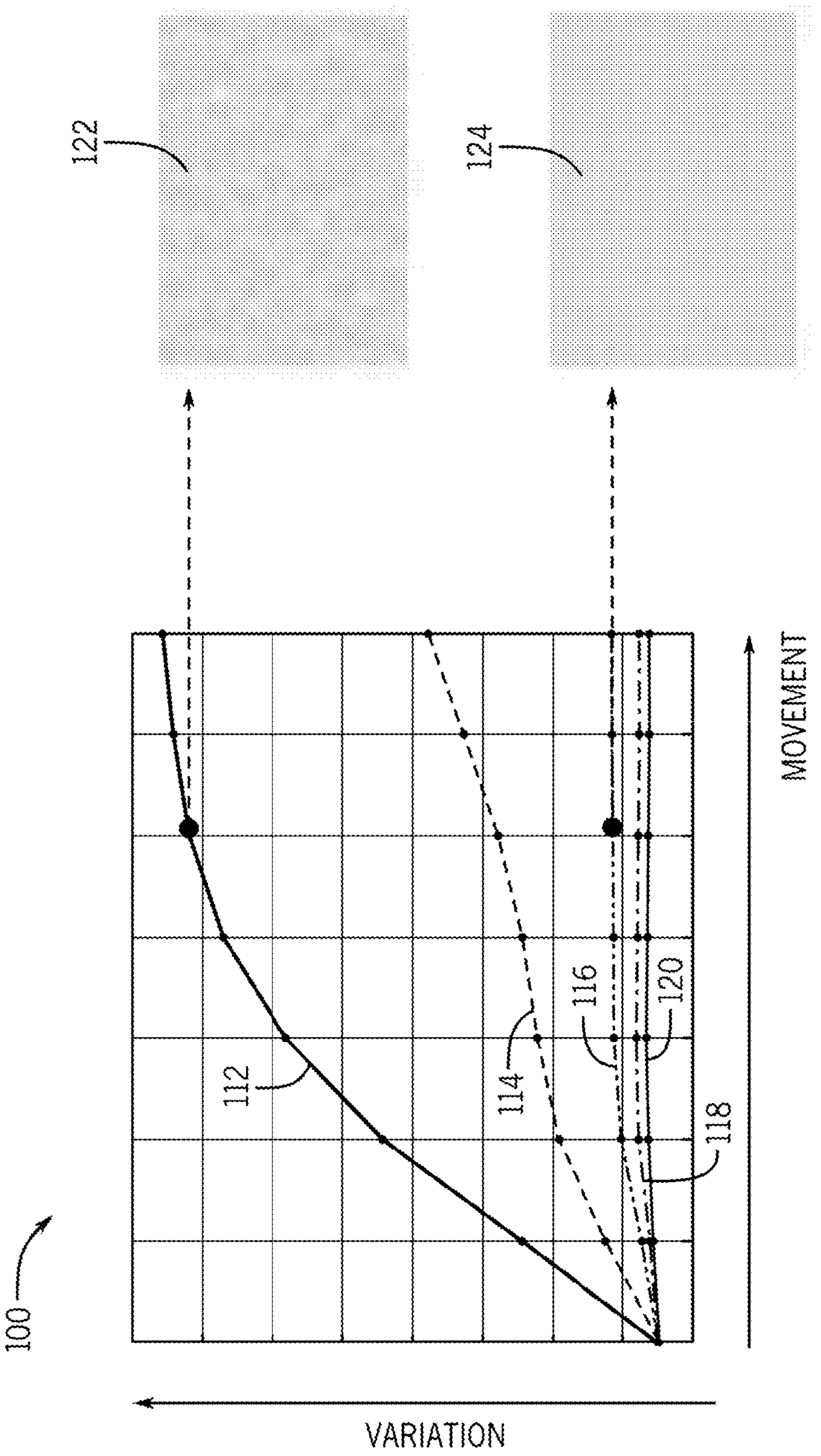
FIG. 11 is a graph depicting a presence of image artifacts within the image content for a number of pulse cycles in a period, in accordance with an embodiment.

FIG. 11 illustrates a graph 110 corresponding to variation in intensity of an image over different amounts of motion with varying pulse width modulation schemes. The graph 110 includes five lines corresponding to a number of pulse cycles applied to create the image content over the same period. A first line 112 may correspond to a one-pulse-cycle period, a second line 114 may correspond to a two-pulse-cycle period, a third line 116 may correspond to a four-pulse-cycle period, a fourth line 118 may correspond to a six-pulse-cycle period, and a fifth line 120 may correspond to an eight-pulse-cycle period. The x-axis of the graph 110 corresponds to movement, which may include an amount of head movement, head velocity, or a direction of movement of the viewer's head or eyes in relation to the display 12. The y-axis of the graph 110 corresponds to apparent display pixel variation for the reasons discussed above with reference to FIG. 10. The y-axis of the graph 110 thus represents a perceivability of image artifacts present in the image content.

Image content displayed using the one-pulse-cycle period illustrated by the first line 112 may include increasingly noticeable image artifacts as motion increases, as shown by an example image 122. Using multiple cycles of display pulses, however, may result in less apparent display pixel variation. In fact, splitting the pulse of the one-pulse-cycle period may result in substantially lower apparent display pixel variation due to motion. For example, the pulse may be divided into two, four, six, eight, or more pulses. As a consequence, perceivable image artifacts such as shimmering may be reduced or eliminated. An example is shown by an image 124, which results from a four-pulse-cycle period at the same level of motion as that of image 122. As the number of pulse cycles increases, the variation of the image content due to motion appears to decrease, meaning the viewer's eye(s) may be evenly integrating the pulses of the display 12.

Figure 12:
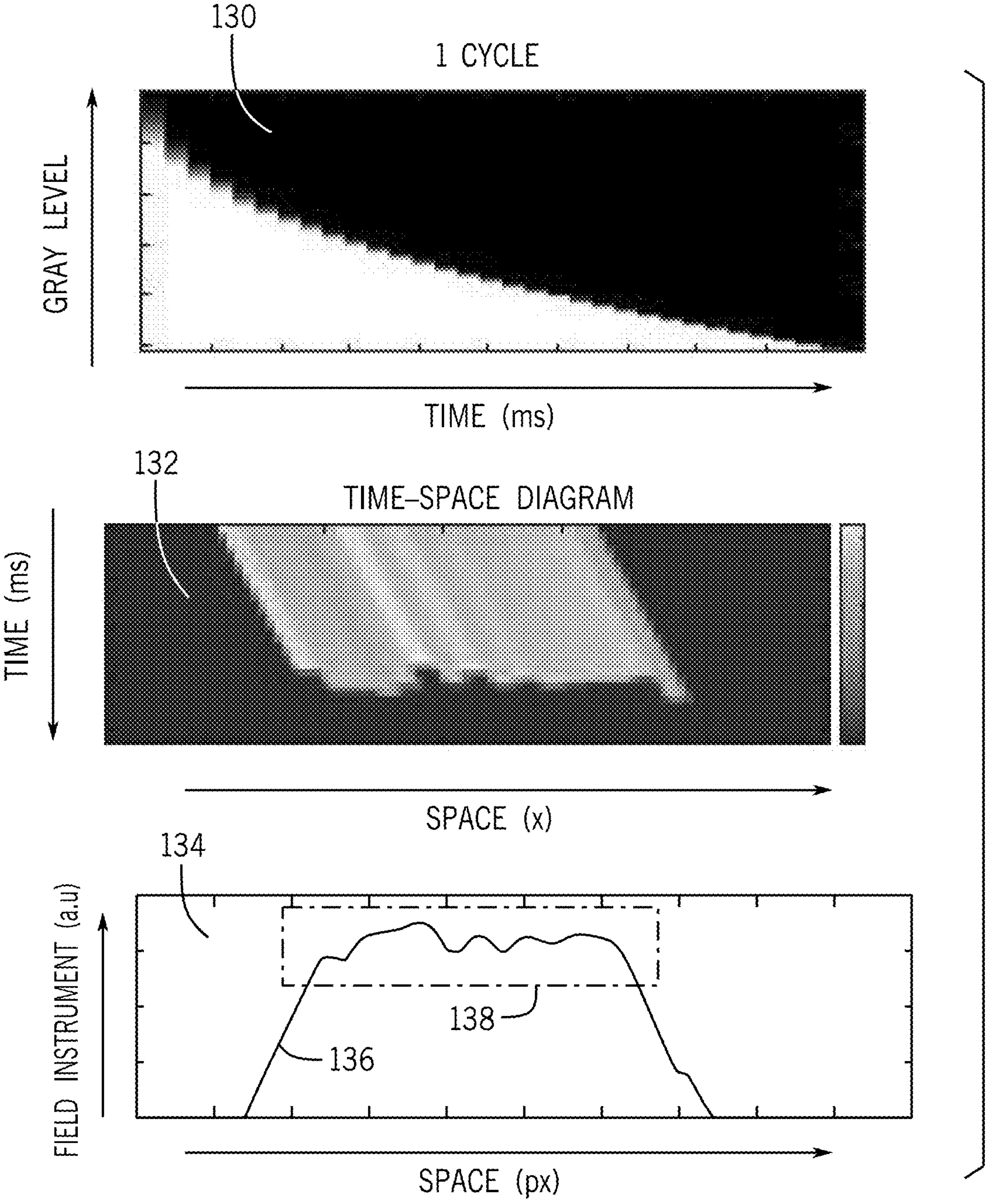
FIG. 12 illustrates three graphs depicting a luminance and an intensity of one pulse over time and space, in accordance with an embodiment.
Figure 13:
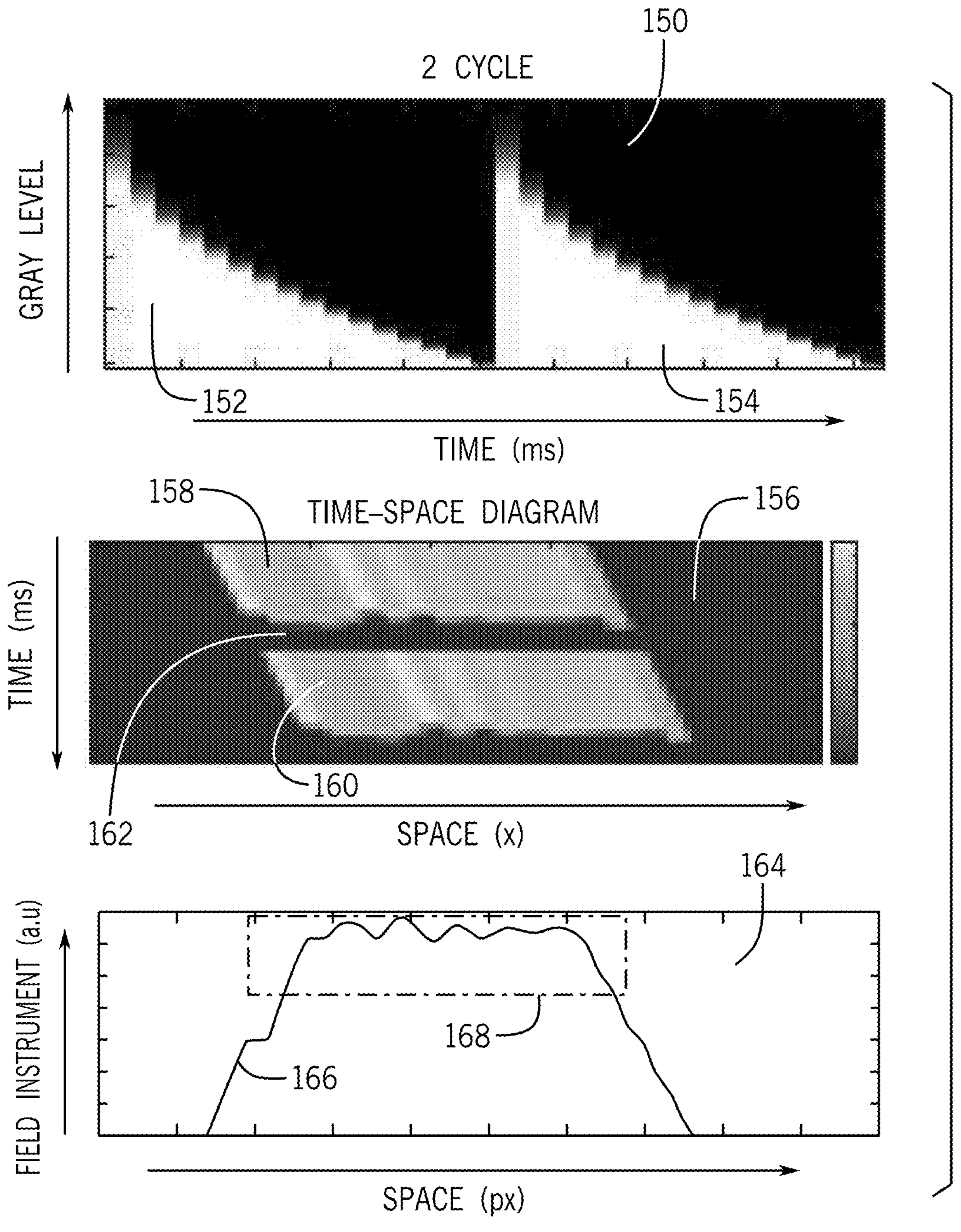
FIG. 13 illustrates three graphs depicting the luminance and the intensity of two pulses over time and space, in accordance with an embodiment.
Figure 14:
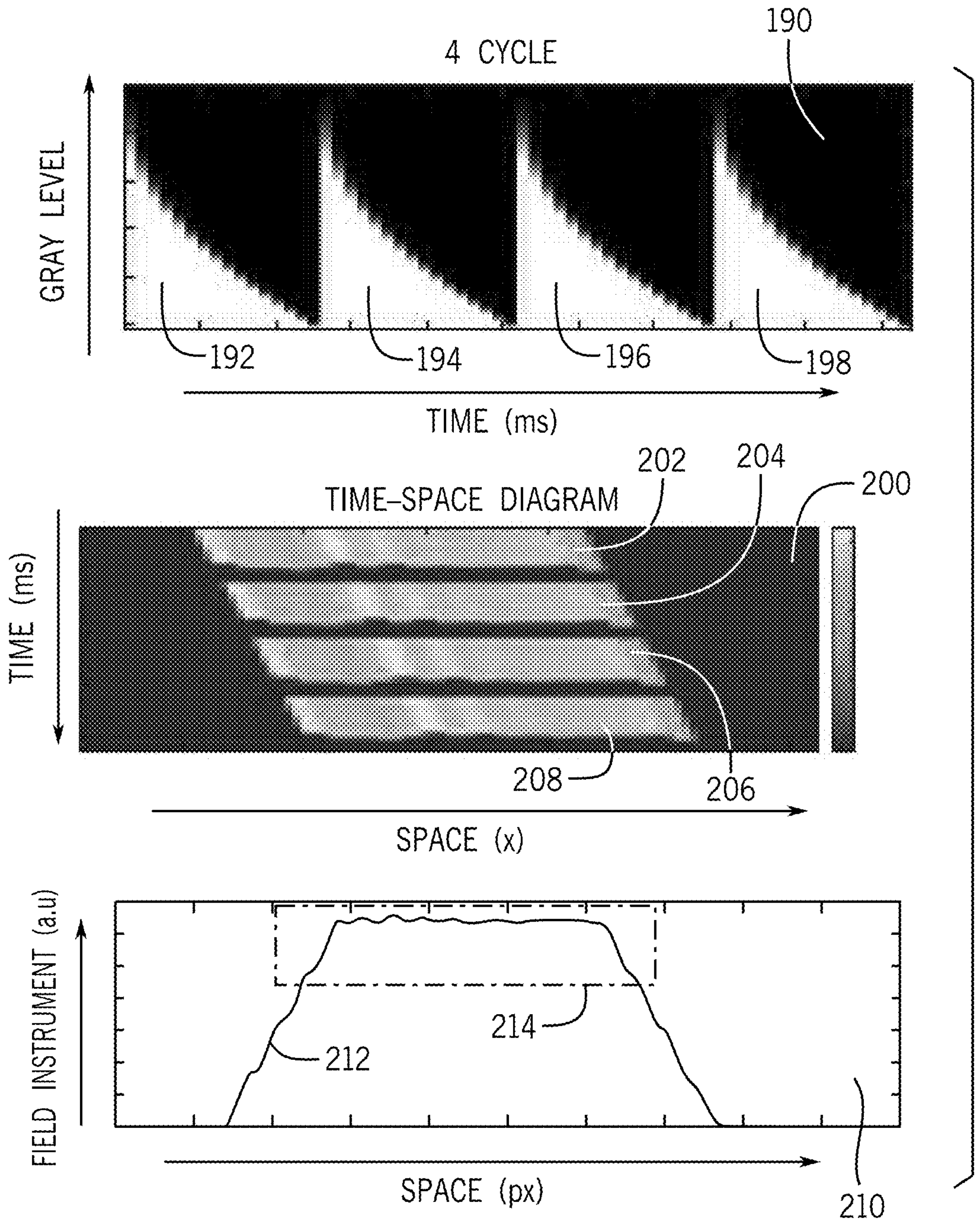
FIG. 14 illustrates three graphs depicting the luminance and the intensity of four pulses over time and space, in accordance with an embodiment.

FIGS. 12, 13, and 14 illustrate the effect of multiple pulse cycles per period to reduce image artifacts due to motion. In some instances, the different numbers of pulse cycles may be completed in periods having a frequency of 30 Hz, 60 Hz, 120 Hz, 240 Hz, 480 Hz, 960 Hz, or the like. For instance, a single pulse cycle running at 480 Hz may be divided into multiple pulse cycles over a total time of 2.1 ms. For example, at 480 Hz, the single pulse may be divided into two identical pulses such that two pulse cycles may be completed in the same 2.1 ms period. It may be beneficial to further divide the pulse into multiple pulses, such as four pulses, six pulses, eight pulses, and so on to further reduce or eliminate image artifacts due to motion. In certain embodiments, the pulse may be divided into multiple nearly identical pulses. In other embodiments, the pulse may be divided according to a specified pattern or a random pattern in which the total amount of light emitted by a display pixel by the multiple pulses remains equivalent to the total amount of light that would be emitted by a single pulse. Accordingly, FIGS. 12, 13, and 14 illustrate the variation in luminance over space for a one-pulse-cycle period, a two-pulse-cycle period, and a four-pulse-cycle period, respectively.

FIG. 12 illustrates the luminance from the one-pulse-cycle period over time and space with motion. A graph 130 depicts the use of a one-pulse-cycle period to achieve different gray levels. The graph 130 illustrates how the length of time of the pulse relates to the gray level (total light) displayed over the full pulse cycle. Here, the gray levels are represented as 8-bit gray levels from values of 0 to 255, but gray levels of any suitable bit depth may be used. As shown in the graph 130, achieving gray level 0 involves no pulse. Gray levels 1 to 50 involve very short pulses. Achieving higher gray levels involves progressively longer pulses. The highest gray level involves a pulse that extends substantially through one full period.

A graph 132 depicts the pulses of 15 display pixels as integrated by the viewer's eyes over time and space with motion. The x-axis of the graph 132 corresponds to locations at the viewer's eye (here, corresponding to display pixels of a row of display pixels) and the y-axis of the graph 90 corresponds to an amount of time light is received at each location at the viewer's eye (here, corresponding to the amount of time each display pixel is pulsed). There are fifteen display pixels emitting pulses of light that each individually corresponds to an equal amount of light between the display pixels. As shown by a graph 130, however, the pulses from the display pixels may be unevenly integrated by the viewer's eyes due to motion (e.g., head movement). For example, certain portions of the pulse from the display pixel may be added or subtracted from the pulse of neighboring display pixels due to uneven integration of the viewer's eyes caused by motion. The uneven integration may cause variations in intensity when the viewer's eyes may be integrating the pulses from the display pixels. The resulting image may include image artifacts due to variations in intensity. In the graph 134, which includes a line 136 representing the total luminance integrated by the eye(s) over space, a section 138 illustrates that there appears to the viewer to be display pixels emitting light with an uneven intensity. The jagged peaks of the section 138 may be representative of an uneven integration of the one pulse of the pixels by the viewer's eyes due to motion. As such, the viewer may perceive image artifacts within the image content on the electronic display 12.

To reduce the uneven integration, the single pulse may be split into multiple pulses. FIG. 13 illustrates the luminance for a two-pulse-cycle period as integrated by the viewer's eyes with motion. A graph 150 depicts the use of a two-pulse-cycle period to achieve different gray levels. The graph 150 illustrates how the amount of time of the pulse relates to the gray level (total light) displayed over the full two-cycle period. Here, the gray levels are represented as 8-bit gray levels from values of 0 to 255, but gray levels of any suitable bit depth may be used. As shown in the graph 150, achieving gray level 0 involves no pulse. Gray levels 1-255 may be achieved by two identical pulses 152 and 154 of a length that corresponds to the gray level. For example, gray levels 1 to 50 involve two very short pulses. Achieving higher gray levels involves progressively longer sets of two pulses. The highest gray level involves two pulses that, in total, extend substantially through the entire period.

The two pulses may be identical or nearly identical, or may be different but providing the same total light output across two pulse cycles as would be emitted by the single pulse cycle of the same period. For example, the pulse width modulation scheme may split the pulse width of the single pulses in half to achieve the two-pulse-cycle period. For example, as illustrated in graph 156, the first pulse 152 and the second pulse 154 may cause display pixels to emit corresponding first pulses 158 and second pulses 160. A gap 162 represents time during which no light is emitted (e.g., if the gray level is less than 255) between the first pulses 158 and second pulses 160. Although the single pulse may be divided into two pulses, the duty cycle of the two-pulse-cycle period of FIG. 13 may be equivalent to the duty cycle of the one-pulse-cycle period of FIG. 12.

Indeed, in a graph 164 of FIG. 13, which includes a line 166 representing the total luminance integrated by the eye(s) over space, a section 168 illustrates that there appears to the viewer to be display pixels emitting light with slightly less uneven intensity. The peaks of luminance of the section 168 of FIG. 13 are much smaller compared to those of the section 138 of FIG. 12. As such, image artifacts within the image content on the electronic display 12 may be reduced or eliminated.

Image artifacts due to motion may be further reduced by a four-pulse-cycle period, as shown in FIG. 14. FIG. 14 illustrates the luminance for a four-pulse-cycle period as integrated by the viewer's eye(s) with motion. A graph 190 depicts the use of a four-pulse-cycle period to achieve different gray levels. The graph 190 illustrates how the total amount of time of the pulses relates to the gray level (total light) displayed over the full four-cycle period. Here, the gray levels are represented as 8-bit gray levels from values of 0 to 255, but gray levels of any suitable bit depth may be used. As shown in the graph 190, achieving gray level 0 involves no pulse. Gray levels 1-255 may be achieved by four identical pulses 192, 194, 196, and 198 of a total length that corresponds to the gray level. For example, gray levels 1 to 50 involve four very short pulses. Achieving higher gray levels involves progressively longer sets of four pulses. The highest gray level involves four pulses that, in total, extend substantially through the entire period.

The four pulses may be identical or nearly identical, or may be different but providing the same total light output across four pulse cycles as would be emitted by the single pulse cycle in the same period. For example, the pulse width modulation scheme may split the pulse width of the single pulses in fourths to achieve the four-pulse-cycle period. For example, as illustrated in graph 200, the pulses 192, 194, 196, and 198 may cause display pixels to emit corresponding pulses 202, 204, 206, and 208. Gaps between these pulses represent times during which no light is emitted (e.g., if the gray level is less than 255). Although the single pulse may be divided into four pulses, the duty cycle of the four-pulse-cycle period of FIG. 13 may be equivalent to the duty cycle of the one-pulse-cycle period of FIG. 11.

Indeed, in a graph 210 of FIG. 14, which includes a line 212 representing the total luminance integrated by the viewer's eyes over space, a section 214 illustrates that there appears to the viewer to be display pixels emitting light with substantially much more even intensity. The section 214 of FIG. 14 is much smoother compared to the section 138 of FIG. 12. As such, image artifacts within the image content on the electronic display 12 may be reduced or eliminated by increasing the number of pulse cycles per period as compared to a single pulse.

While the illustrated examples split the pulses into nearly identical pulses, the pulses may be split any suitable manner with any suitable pulse width. For example, the pulse may be split into six, eight, ten, or more pulses.

Figure 15:
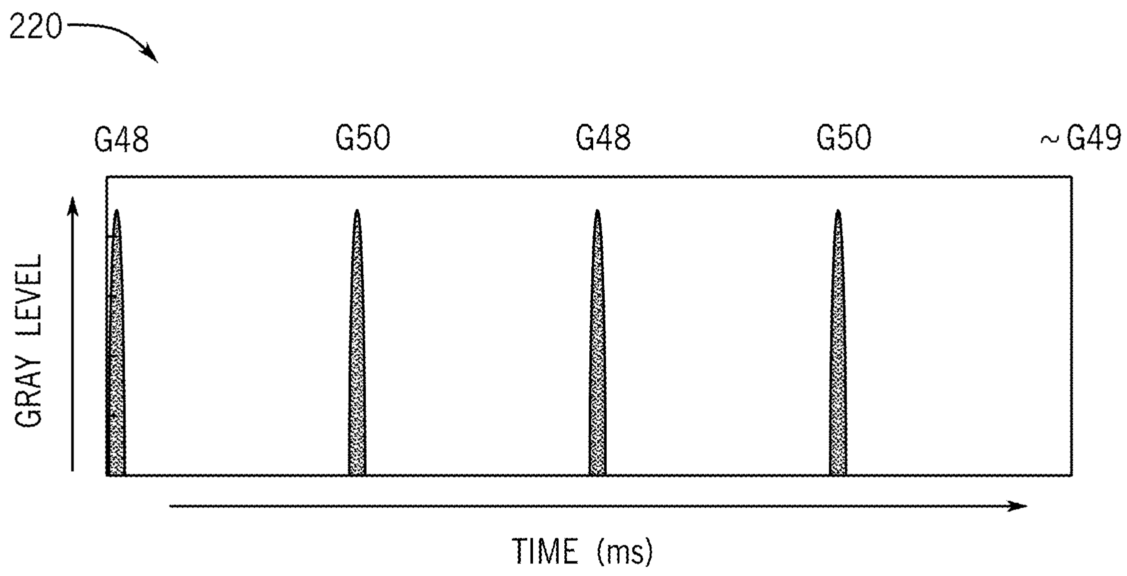
FIG. 15 is a graph depicting the gray level of the four pulses over time, in accordance with an embodiment.

Moreover, multiple pulses of a single pulse period may be different but still may collectively result in the same amount of light that would have been emitted in a single pulse. This may allow the multiple pulses to have a lower granularity due to a lower bit depth than a longer, single pulse while retaining the same overall precision. Consider an example shown in FIG. 15. In FIG. 15, a graph 220 illustrates the use of a four-pulse-cycle period to achieve a gray level of 49 (G49) out of 255 (e.g., a total equivalent bit depth of 8 bits over the period). Individually, the multiple pulses may have a lower bit depth than would an equivalent single pulse for the entire period. The multiple pulses may effectively perform dithering to achieve overall gray levels of higher precision for an entire period than would be available to each individual pulse of the multiple pulses. In the example of FIG. 15, by selecting the first pulse to have an equivalent gray level of G48, the second pulse to have an equivalent gray level of G50, the third pulse to have an equivalent gray level of G48, and the fourth pulse to have an equivalent gray level of G50, the average luminance for the period will be equivalent to a gray level of G49. This may be achieved through a form of least significant bit (LSB) splitting of incoming image data, whereby the additional bit of precision is selectively applied or not applied to two of the four pulses. Accordingly, a total duty cycle of the four pulses may be made equivalent to a corresponding duty cycle of a single pulse.

Figure 16:
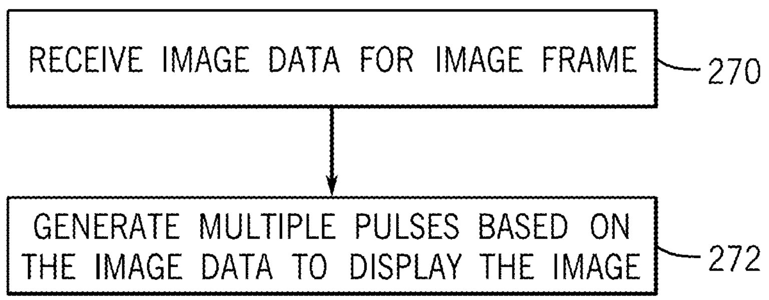
FIG. 16 is a flow diagram of a method for splitting the pulse based on the pulse width modulation scheme, in accordance with an embodiment.

FIG. 16 is a flow diagram that provides a more in-depth discussion of the pulse width modulation scheme. As described herein, the single pulse of the display pixel may be split into multiple pulses to reduce or eliminate image artifacts within the image content by distributing error over the multiple pulses. In an embodiment, the pulse may be split into multiple nearly identical pulses. In another embodiment, the pulse may be split unevenly or randomly.

For example, the pulse may be split into four pulses with a different gray level and a different pulse width. While the process of FIG. 16 is described using process blocks in a specific sequence, it should be understood that the present disclosure contemplates that the described process blocks may be performed in different sequences than the sequence illustrated, and certain described process blocks may be skipped or not performed altogether.

At block 270, processing circuitry (e.g., the processor core complex, image processing circuitry, image compensation circuitry) receives image data corresponding to one or more display pixels. As described herein, the image data may correspond to a gray level, a pulse width, a duty cycle, a digital code, or the like. The image data may also correspond to a bit depth that corresponds to color information stored in an image. In certain embodiments, the image data may be a digital code that may be associated with a display pixel. The image data may also include a frequency (e.g., refresh rate) at which to drive the display pixels to emit light to the display.

In some cases, the image data may be split on a log(2)(x) basis, where x is associated with the number of pulse cycles. As such, for the two-pulse-cycle period, 1 LSB of data may be distributed between the two pulses to achieve an equivalent precision at a lower bit depth. For the four-pulse-cycle period, 2 LSBs of data may be distributed and for an eight-pulse-cycle period, 3 LSBs of data may be distributed.

At block 272, the processing circuitry may cause the display driver circuitry to generate the multiple pulses based on the image data to display the image content. For example, the processing circuitry may send digital codes to the display driver circuitry to cause the display driver circuitry to toggle the mirrors of the mirror array according to the pulse width. As such, the mirrors of the mirror array may create pulses associated with the display pixels and generate the image content based on the received image data. In an embodiment, the pulse width modulation scheme may be implemented to split what would otherwise be a single pulse into multiple, nearly identical pulses. By way of example, the single pulse may have a pulse width of 2.1 ms. The single pulse may also have a gray level associated with G19 and a frequency of 960 Hertz (Hz). The single pulse may be evenly split into fourths to create the four-pulse-cycle period. The pulses of the four-pulse cycle period may have the same total gray level and frequency as the single pulse, such as G19, 960 Hz, respectively. However, the pulse width of each pulse of the four-pulse-cycle period may be ¼ as long. For example, each pulse may have a maximum pulse width of 0.525 ms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display comprising:

an electronic display panel comprising a display pixel; and display driver circuitry configured to:

receive image data corresponding to the display pixel, wherein the image data defines a total pulse width of time that light is to be emitted from the display pixel for one image frame; and cause the display pixel to emit light in multiple pulses totaling to the total pulse width for the display pixel for the one image frame.

2. The electronic display of claim 1, wherein the multiple pulses comprise two pulses with respective pulse widths totaling to the total pulse width for the one image frame.

3. The electronic display of claim 1, wherein the multiple pulses comprise four pulses with respective pulse widths totaling to the total pulse width for the one image frame.

4. The electronic display of claim 1, wherein at least two of the multiple pulses have different respective pulse widths.

5. The electronic display of claim 1, wherein the multiple pulses are respectively defined by a bit depth lower than a bit depth of the image data.

6. The electronic display of claim 5, wherein the display driver circuitry is configured to split the image data between the multiple pulses, wherein splitting the image data is based on a log(2) function.

7. The electronic display of claim 1, wherein the electronic display panel comprises the display pixel and additional display pixels of one or more colors.

8. The electronic display of claim 1, comprising an optical combiner, a lens, and a light guide, wherein the optical combiner is configured to direct the light emitted from the display pixel towards a viewing area, and wherein the lens and the light guide are configured to receive the light from the optical combiner and direct the light to the viewing area.

9. The electronic display of claim 8, wherein the electronic display panel comprises a monolithic display panel comprising the display pixel and a first plurality of additional display pixels of only a first color.

10. The electronic display of claim 9, comprising:

a second monolithic display panel comprising a second plurality of additional display pixels of only a second color; and a third monolithic display panel comprising a third plurality of additional display pixels of only a third color;

wherein the display driver circuitry is configured to:

receive second image data corresponding to the second plurality of additional display pixels, wherein the second image data defines a second total pulse width of time that light emitted from the second plurality of additional display pixels is directed by the optical combiner to the viewing area for the one image frame;

receive third image data corresponding to the third plurality of additional display pixels, wherein the third image data defines a third total pulse width of time that light emitted from the third plurality of additional display pixels is directed by the optical combiner to the viewing area for the one image frame; and wherein the optical combiner is configured to combine the light emitted from the display pixel, the second plurality of additional display pixels, and the third plurality of additional display pixels to form the one image frame.

11. A method comprising:

receiving image data, via processing circuitry, corresponding to a display pixel of an electronic display, wherein the image data corresponds to a duty cycle of the display pixel for one image frame; and causing, via the processing circuitry, display driver circuitry to drive the display pixel based on the duty cycle, wherein driving the display pixel comprises driving the display pixel to emit multiple pulses per duty cycle for the one image frame.

12. The method of claim 11, wherein the image data comprises a gray level of the display pixel for the one image frame.

13. The method of claim 12, wherein the multiple pulses comprise substantially identical pulses each corresponding to the gray level of the display pixel.

14. The method of claim 12, wherein the multiple pulses comprise non-identical pulses that collectively correspond to the gray level of the display pixel.

15. The method of claim 12, wherein the display driver circuitry is configured to receive the image data as a digital code based on the gray level and a global brightness value of the electronic display, and wherein the processing circuitry is configured to drive the display pixel based on the digital code.

16. An electronic device comprising:

processing circuitry configured to generate an image frame of image data; and an electronic display configured to display the image frame of image data, wherein the electronic display comprises:

a first monolithic display panel comprising display pixels of only a first color, wherein different display pixels of the first monolithic display panel have different light emission characteristics such that some display pixels are brighter and some display pixels are darker over a same period of time; and display driver circuitry configured to receive image data that defines total pulse widths for different display pixels for the image frame that differ based on respective gray levels for the display pixels and the different light emission characteristics for the display pixels, wherein the display driver circuitry is configured to control a light emission from respective display pixels in multiple pulses that respectively correspond to respective pulse widths of the total pulse widths.

17. The electronic device of claim 16, wherein the multiple pulses comprise at least two pulses that respectively correspond to respective pulse widths of the total pulse widths.

18. The electronic device of claim 16, wherein the multiple pulses comprise at least four pulses that respectively correspond to respective pulse widths of the total pulse widths.

19. The electronic device of claim 16, wherein respective sets of the multiple pulses have identical pulse widths.

20. The electronic device of claim 16, wherein respective sets of the multiple pulses have non-identical pulse widths.

* * * * *